(12) United States Patent
Lee

(10) Patent No.: US 9,972,232 B2
(45) Date of Patent: May 15, 2018

(54) LIQUID CRYSTAL DISPLAY DEVICE AND METHOD FOR TESTING PIXELS OF THE SAME

(71) Applicant: LG Display Co., Ltd., Seoul (KR)

(72) Inventor: Jun Yeob Lee, Gyeongsan-si (KR)

(73) Assignee: LG Display Co., Ltd., Seoul (KR)

( * ) Notice: Subject to any disclaimer, the term of this patent is extended or adjusted under 35 U.S.C. 154(b) by 312 days.

(21) Appl. No.: 14/821,183

(22) Filed: Aug. 7, 2015

(65) Prior Publication Data
US 2016/0042677 A1  Feb. 11, 2016

(30) Foreign Application Priority Data

Aug. 7, 2014  (KR) ........................ 10-2014-0101782

(51) Int. Cl.
| | |
|---|---|
| *G02F 1/1343* | (2006.01) |
| *G09G 3/00* | (2006.01) |
| *G02F 1/13* | (2006.01) |
| *G02F 1/1345* | (2006.01) |
| *G02F 1/1362* | (2006.01) |
| *G02F 1/1368* | (2006.01) |

(52) U.S. Cl.
CPC ........... *G09G 3/006* (2013.01); *G02F 1/1309* (2013.01); *G02F 1/1345* (2013.01); *G02F 1/1368* (2013.01); *G02F 1/136286* (2013.01); *G02F 2001/136254* (2013.01)

(58) Field of Classification Search
CPC ................. G02F 1/1368; G02F 1/1309; G02F 1/136286; G02F 1/1345; G02F 2001/136254; G09G 3/006

USPC ......................................................... 349/139
See application file for complete search history.

(56) References Cited

U.S. PATENT DOCUMENTS

| | | | |
|---|---|---|---|
| 6,127,998 A | 10/2000 | Ichikawa et al. | |
| 8,884,641 B2 * | 11/2014 | Bawolek ................ | G09G 3/006 324/762.01 |

(Continued)

FOREIGN PATENT DOCUMENTS

| | | |
|---|---|---|
| CN | 1187632 A | 7/1998 |
| CN | 102955306 A | 3/2013 |

(Continued)

OTHER PUBLICATIONS

Office Action for Chinese Patent Application No. CN 201510484428.2, dated Dec. 15, 2017, 13 Pages (With English Translation).

*Primary Examiner* — Hoan C Nguyen
(74) *Attorney, Agent, or Firm* — Fenwick & West LLP

(57) ABSTRACT

A liquid crystal display (LCD) device and a method for testing pixels of the LCD device are disclosed, in which pixels adjacent to each other vertically are arranged in a display area to share a gate line and an auto probe test pattern of the pixels is arranged in a non-display area. The LCD device comprises a plurality of pixels arranged in a display area; and a test pattern arranged in a non-display area, for supplying a test signal to each of the plurality of pixels, wherein two pixels, which are adjacent to each other vertically, among the plurality of pixels, share a single gate line and receive data voltages from different data lines different from each other, and the test pattern includes at least one data shorting bar and at least one switching unit to supply the test signal to each of the plurality of pixels per color.

11 Claims, 15 Drawing Sheets

(56) References Cited

U.S. PATENT DOCUMENTS

| | | | |
|---|---|---|---|
| 2003/0122976 A1 | 7/2003 | Choi et al. | |
| 2004/0017531 A1 | 1/2004 | Nagata et al. | |
| 2007/0046316 A1* | 3/2007 | Uei | G09G 3/006 324/760.01 |
| 2007/0194348 A1* | 8/2007 | Yang | G09G 3/006 257/202 |
| 2009/0086149 A1* | 4/2009 | Kim | G02F 1/134363 349/144 |
| 2010/0109693 A1 | 5/2010 | Lee | |
| 2013/0135360 A1 | 5/2013 | Hwang et al. | |
| 2013/0155356 A1* | 6/2013 | Jang | G02F 1/1343 349/106 |
| 2013/0321730 A1 | 12/2013 | Huang | |
| 2014/0145739 A1 | 5/2014 | Park et al. | |
| 2014/0210868 A1* | 7/2014 | Cho | G09G 3/3648 345/690 |

FOREIGN PATENT DOCUMENTS

| | | |
|---|---|---|
| CN | 103839503 | 6/2014 |
| CN | 103969900 A | 8/2014 |
| KR | 20060119399 A | 11/2006 |
| KR | 20100048285 A | 5/2010 |

\* cited by examiner ic display (LCD) device in which pixels adjacent to each other in a vertical direction, i.e., up and down within one gate line, are arranged in a display area to share a gate line and an auto probe test pattern is arranged in a non-display area. The present invention also relates to a method for testing the pixels of the LCD device.

LIQUID CRYSTAL DISPLAY DEVICE AND METHOD FOR TESTING PIXELS OF THE SAME

CROSS REFERENCE TO RELATED APPLICATIONS

This application claims the benefit of the Korean Patent Application No. 10-2014-0101782 filed on Aug. 7, 2014, which is hereby incorporated by reference for all purposes as if fully set forth herein.

BACKGROUND OF THE INVENTION

Field of the Invention

The present invention relates to a liquid crystal display (LCD) device in which pixels adjacent to each other in a vertical direction, i.e., up and down within one gate line, are arranged in a display area to share a gate line and an auto probe test pattern is arranged in a non-display area. The present invention also relates to a method for testing the pixels of the LCD device.

Discussion of the Related Art

With the development of various portable electronic devices such as mobile terminals and notebook computers, the demands on flat panel display devices which are applicable to those devices are increasing.

Among the flat panel display devices, an LCD device is suitable for portable devices owing to various advantages such as being a highly-developed technology for mass production, easiness as a driving means, low power consumption, high picture quality, and providing a large-sized screen, and its application fields have been increased.

The LCD device displays images based on image signals by converting image signals, which are externally input, to data voltages, and controlling transmittance of light of a liquid crystal layer of a plurality of pixels.

The LCD device is fabricated by performing a process of forming various patterns including a thin film transistor (TFT) on a TFT array substrate (lower substrate), a process of forming various patterns including a color filter layer on a color filter array substrate, a liquid crystal cell process of bonding the TFT array substrate and the color filter array substrate to each other and injecting a liquid crystal between the TFT array substrate and the color filter array substrate, and a module process of connecting the TFT array substrate with a driving circuit.

After the TFT array substrate is fabricated, a process of testing an auto probe for detecting a line defect such as a shortage of lines formed on the substrate, a defect of the TFT, and a defect of a pixel pattern is performed.

A test pattern for an auto probe test is arranged in a non-display area of a liquid crystal panel. A shorting bar is used as the test pattern for an auto probe test, and a driving signal is applied to the gate and data lines through the shorting bar, whereby it is tested whether the lines and pixels on the TFT array substrate have been formed correctly.

FIG. 1 briefly illustrates an LCD device on which an auto probe test pattern is arranged in accordance with the related art. A TFT array substrate of a liquid crystal panel is shown in FIG. 1.

Referring to FIG. 1, the TFT array substrate of the LCD device according to the related art includes a display area A/A and a non-display area N/A.

In the display area A/A, a plurality of gate lines 12 and a plurality of data lines 14 are arranged to cross each other, and a plurality of pixels 16 are defined by crossing between the gate lines 12 and the data lines 14. A thin film transistor TFT and a storage capacitor Cst are arranged in each of the plurality of pixels 16.

A pixel structure of one gate/one data is shown in FIG. 1. Pixels 16 of red, green, and blue are arranged in the shape of a stripe. The pixels 16 arranged on one horizontal line are supplied with a scan signal from the same gate line 12, whereby their TFTs are switched. The pixels 16 of the same color, which are arranged on one vertical line, display images by receiving a data voltage from the same data line 14.

In the non-display area N/A, test patterns are arranged to test whether the plurality of gate lines 12, the plurality of data lines 14, and the plurality of pixels 16 have been formed correctly. A plurality of enable switches 20 and a plurality of data shorting bars 30 are arranged as the test patterns. The plurality of enable switches 20 are connected to the plurality of data shorting bars 30 through a plurality of link lines 40, and are connected to the plurality of data lines 14 through a link line and a data pad (not shown).

Although FIG. 1 illustrates that three data shorting bars 30 are used, there is no limitation in the number of data shorting bars 30, and two or six data shorting bars may generally be arranged to perform the auto probe test.

If two data shorting bars 30 are used, the plurality of data lines 14 may be divided into even lines and odd lines, and the entire plurality of pixels 16 is divided in half, whereby the pixels are tested. If three data shorting bars 30 are arranged, the plurality of data lines 14 may be divided into data lines of red pixels, data lines of green pixels, and data lines of blue pixels, whereby the pixels are tested for each color.

In the LCD device according to the related art, the pixels 16 of red, green, and blue are arranged in the shape of a stripe, and the test patterns are arranged to be suitable for a structure of pixels of a general LCD device, wherein the pixels do not share the gate and data lines. The pixels 16 may be tested for each color of the pixels of red, green, and blue by using the three shorting bars 30.

Recently, although a pixel structure of two data/one gate, in which pixels adjacent to each other in a direction perpendicular to the extension direction of the gate lines 12, i.e. in a vertical direction or up and down, share a gate line, has been developed, a problem occurs in that an auto probe test cannot be performed for the pixel structure of two data/one gate by the test patterns shown in FIG. 1. That is, the arrangement structure of the pixels 16 and the test pattern for an auto probe test are not matched with each other, whereby the auto probe test cannot be performed normally.

The pixel structure, the test pattern, and the method for testing pixels, which are described as above, have been used by the inventor of this application to devise the present invention, or are technical information obtained during the procedure of devising the present invention. Therefore, the pixel structure, the test pattern, and the method for testing pixels, which are described as above, may not be regarded as the known art disclosed to the general public prior to a filing date of the present invention.

SUMMARY OF THE INVENTION

Accordingly, the present invention is directed to a liquid crystal display (LCD) device and a method for testing pixels of the same, which substantially obviate one or more problems due to limitations and disadvantages of the related art.

An advantage of the present invention is to provide an LCD device that includes a test pattern for an auto probe test of a pixel structure of two data/one gate, in which pixels adjacent to each other in a direction perpendicular to the extension direction of the gate lines, i.e. up and down, share a gate line. In this application, the extension direction of the gate lines is referred to as the horizontal direction or line direction, while the extension direction of the data lines is referred to as up and down, i.e. as the vertical direction or column direction. Thus, the test pattern according to the present invention allows testing of whether a plurality of gate lines, a plurality of data lines, or a plurality of pixels is formed correctly.

Another advantage of the present invention is to provide a method for testing pixels for an auto probe test of a pixel structure of two data/one gate, in which pixels adjacent to each other vertically share a gate line.

Additional advantages and features of the invention will be set forth in part in the description which follows and in part will become apparent to those having ordinary skill in the art upon examination of the following, or may be learned from practice of the invention. The objectives are solved by the features of the independent claims. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display (LCD) device comprises a plurality of pixels arranged in a display area; and a test pattern, arranged in a non-display area, for supplying a test signal to each of the plurality of pixels, the test pattern including at least one data shorting bar and at least one switching unit to supply the test signal to each of the plurality of pixels per color. The pixels may be defined by a plurality of gate lines and a plurality of data lines crossing each other. Also the pixels may include pixels of different colors, e.g. red, green, blue, or white pixels. Preferably, two pixels, which are adjacent to each other vertically, among the plurality of pixels, are configured to share a single gate line and to receive data voltages from different data lines different from each other. The two adjacent pixels may have the same color. Thus, two adjacent pixels in a direction perpendicular to the gate lines may be connected to the same gate line. That is, preferably, two pixels which are adjacent to each other, with a gate line in between, are both connected to this gate line, but connected to different data lines. Preferably, pixels of different colors are arranged alternately in a line direction, i.e. in parallel to the gate lines, and pixels of the same color are arranged in a vertical direction, i.e. in a direction perpendicular to the gate lines or parallel to the data lines. Preferably, pixels of one color are divided into two pixel groups, the first group of pixels being connected to even gate lines and the second group of pixels being connected to odd gate lines. Hence, there may be two pixel groups per color. Preferably, pixels in a horizontal line are connected alternately to a first (odd-numbered) gate line (e.g. above the pixel line or along a first side of the pixel line) and to a second (even-numbered) gate line (e.g. below the pixel line or along a second side of the pixel line). Hence, pixels may be grouped according to pixel color and connected to even-numbered or odd-numbered gate lines, so that a total number of pixel groups preferably corresponds to twice the number of colors. Thus, pixels of one pixel group may have the same color and be connected to the same type of gate line, i.e. even-numbered or odd-numbered, but to two different data lines. In other words, there may be two different data lines per pixel group.

The test pattern of the LCD device according to the embodiment of the present invention may include a plurality of red data shorting bars dividing red pixels of the plurality of pixels into two groups and supplying the test signal to the two groups; a plurality of green data shorting bars dividing green pixels of the plurality of pixels into two groups and supplying the test signal to the two groups; and a plurality of blue data shorting bars dividing blue pixels of the plurality of pixels into two groups and supplying the test signal to the two groups. Of course, white pixels may also be present in addition to red, green, and blue pixels. Hence, preferably, the test pattern includes two shorting bars per color, so that the pixels of the same color are divided into two groups. A data shorting bar may thus group pixels that have the same color and are connected to even-numbered gate lines, and another data shorting bar may group pixels that also have this color and are connected to odd-numbered gate lines. That is, the data shorting bar may connect link lines connected to data lines and thus to pixels which have the same color and which are connected to the same type of gate line, i.e. either to odd or to even gate lines. The number of data shorting bars or switching units may correspond to the number of pixel groups.

The test pattern of the LCD device according to an embodiment of the present invention may include a single switching unit for selectively supplying the test signals input from the plurality of data shorting bars to the pixels corresponding to the data shorting bars, respectively, e.g. the test signal from the plurality of red data shorting bars, the plurality of green data shorting bars, and the plurality of blue data shorting bars respectively to the red pixels, the green pixels, and the blue pixels.

The test pattern of the LCD device according to an embodiment of the present invention may include a single data shorting bar for supplying the test signal to each of the plurality of pixels.

The test pattern of the LCD device according to an embodiment of the present invention may include a plurality of red switching units dividing red pixels of the plurality of pixels into two groups and supplying the test signal to the red pixels; a plurality of green switching units dividing green pixels of the plurality of pixels into two groups and supplying the test signal to the green pixels; and a plurality of blue switching units dividing blue pixels of the plurality of pixels into two groups and supplying the test signal to the blue pixels. Hence, preferably, the test pattern includes two switching units per color, so that the pixels of the same color are divided into two groups. A switching unit may thus connect pixels that have the same color and that are connected to even-numbered gate lines, and another switching unit may connect pixels that have the same color and that are connected to odd-numbered gate lines.

In another aspect of the present invention, a method for testing pixels of a liquid crystal display (LCD) device comprises supplying a test signal to each of the pixels per color by using at least one data shorting bar and at least one switching unit. Preferably, two pixels adjacent to each other vertically share a single gate line and receive data voltages from different data lines different from each other. Thus, two adjacent pixels in a direction perpendicular to the gate lines may be connected to the same gate line. That is, preferably, two pixels which are adjacent to each other with a gate line in between are both connected to this gate line, but connected to different data lines. Preferably, the plurality of pixels is divided into two groups, the first group of pixels being connected to even gate lines and the second group of pixels being connected to odd gate lines. Preferably, pixels of different colors are arranged alternately in a line direction, i.e. in parallel to the gate lines, and pixels of the same color are arranged in a vertical direction, i.e. in a direction perpendicular to the gate lines and parallel to the data lines. That is, each of red pixels, green pixels, and blue pixels may be divided into two groups. The test signals may be supplied to the respective groups to light or switch on the pixels. Thus, the pixels (e.g. red pixels, green pixels, and blue pixels) may be turned on per color, preferably by sequentially supplying the test signals to the respective groups.

The method may further comprise the steps of supplying a scan signal to odd gate lines and supplying a test signal to an odd group of pixels of a first color connected to the odd gate lines for lighting the odd group of pixels of the first color; and supplying a scan signal to even gate lines and supplying a test signal to an even group of pixels of the first color connected to the even gate lines for lighting the even group of pixels of the first color. That is, the pixels of the one color may be divided into an odd group comprising pixels that are connected to odd gate lines, and into an even group comprising pixels that are connected to even gate lines. For instance, the method may comprise the steps of lighting a first red group of the red pixels by supplying a scan signal to an odd gate line and supplying the test signal to the first red group; and lighting a second red group of the red pixels by supplying a scan signal to an even gate line and supplying the test signal to the second red group. The embodiments of a method described herein may be applied to a LCD device, as described above.

The method may further comprise the steps of lighting a first green group of the green pixels by supplying a scan signal to an even gate line and supplying the test signal to the first green group; and lighting a second green group of the green pixels by supplying a scan signal to an odd gate line and supplying the test signal to the second green group.

The method may further comprise the steps of lighting a first blue group of the blue pixels by supplying a scan signal to an odd gate line and supplying the test signal to the first blue group; and lighting a second blue group of the blue pixels by supplying a scan signal to an even gate line and supplying the test signal to the second blue group. If white pixels are also included, corresponding steps for lighting a first and second white group of the white pixels may be performed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
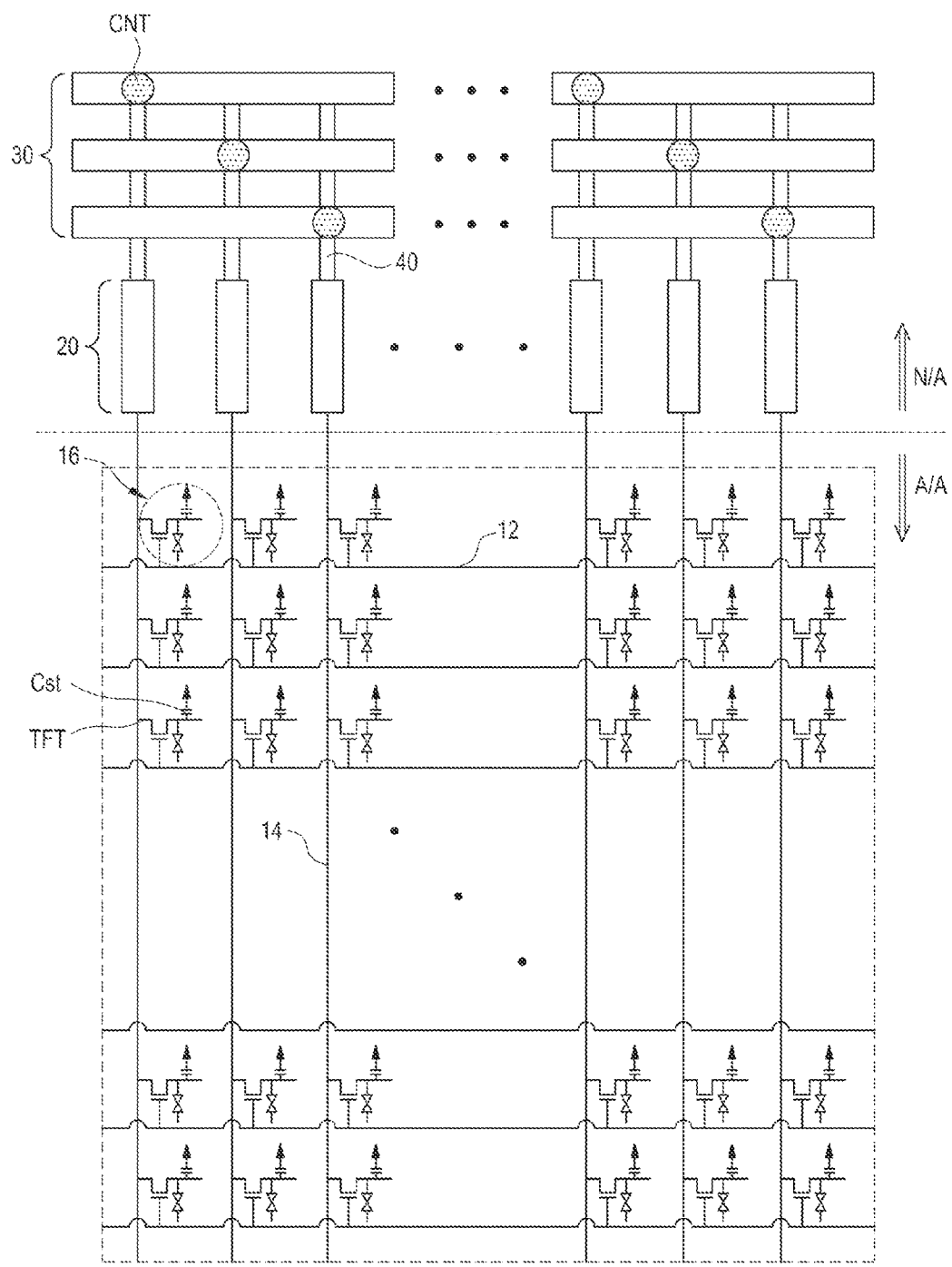
FIG. 1 briefly illustrates an LCD device on which an auto probe test pattern is arranged in accordance with the related art.

Reference will now be made in detail to the exemplary embodiments of the present invention, examples of which are illustrated in the accompanying drawings. Wherever possible, the same reference numbers will be used throughout the drawings to refer to the same or like parts. In the following description of the present invention, if detailed description of elements or functions known in the art of the present invention is not related to the subject matter of the present invention, the detailed description will be omitted.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by the scopes of the claims.

A shape, a size, a ratio, an angle, or a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' are used in the present specification, another part may be added unless 'only~' is used. The terms of a singular form may include plural forms unless specified to the contrary.

In construing an element, the element is construed as including an error range although there is no explicit description. Features of various embodiments of the present invention may be partially or completely coupled to or combined with each other, and may be variously inter-operated with each other and driven technically as those skilled in the art can sufficiently understand. The embodiments of the present invention may be carried out independently from each other, or may be carried out together in a co-dependent relationship.

Prior to description made with reference to the drawings, an LCD device according to an embodiment of the present invention includes a liquid crystal panel, and may also include a driving circuit for driving the liquid crystal panel.

The present invention focuses in particular on a lower substrate (TFT array substrate) of a liquid crystal panel. The lower substrate is fabricated and then shorting bars and line patterns are used for an auto probe test. Therefore, drawings and a detailed description of an upper substrate (color filter array substrate) of the liquid crystal panel and a driving circuit for driving the liquid crystal panel will be omitted.

Hereinafter, an LCD device and a method for testing pixels of the same according to an embodiment of the present invention will be described with reference to the accompanying drawings.

Figure 2:
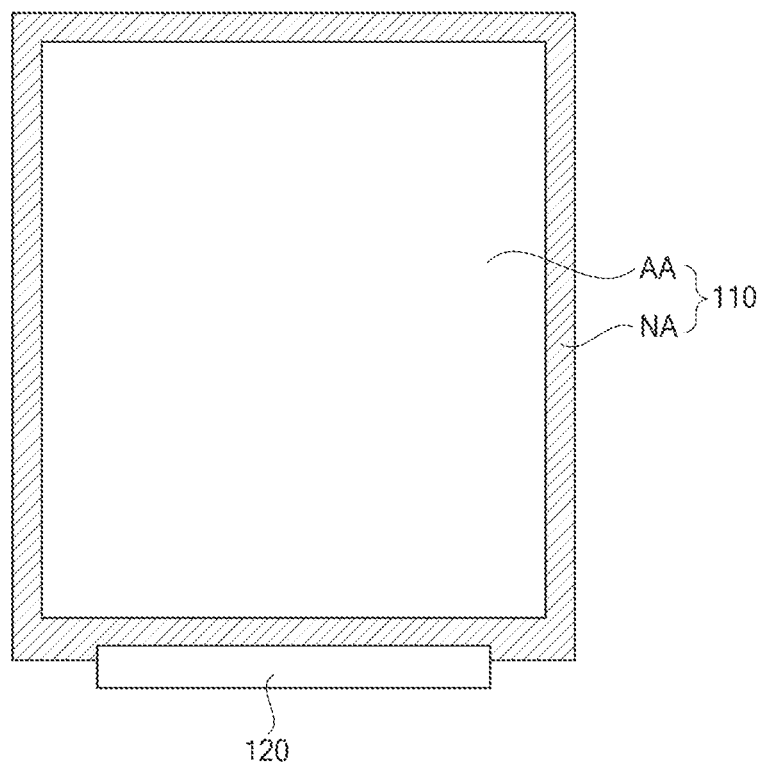
FIG. 2 briefly illustrates an LCD device according to one embodiment of the present invention.
Figure 3:
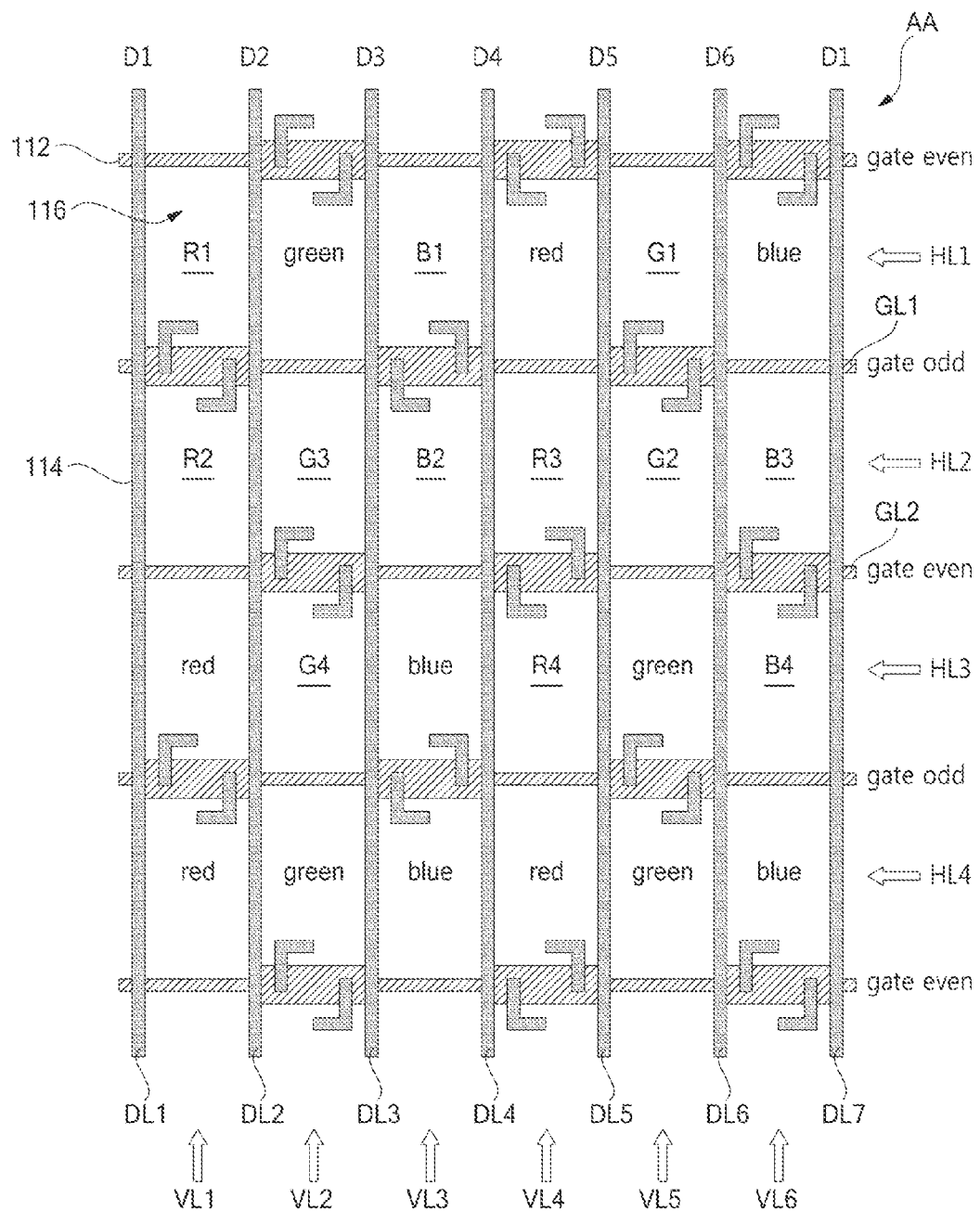
FIG. 3 illustrates a pixel structure arranged in a display area of an LCD device according to one embodiment of the present invention.

FIG. 2 briefly illustrates an LCD device 100 according to the present invention, and FIG. 3 illustrates a pixel structure arranged in a display area of an LCD device according to the present invention. A TFT array substrate of the LCD device 100 is shown in FIG. 3.

Referring to FIGS. 2 and 3, the LCD device 100 of the present invention may include a liquid crystal panel 110 and a driving circuit 120. The liquid crystal panel 110 includes a display area AA and a non-display area NA. The driving circuit 120 may be connected to a link line arranged in the non-display area NA, and outputs a driving signal to the plurality of pixels 116. The driving circuit 120 may include a timing controller, a gate driver, a data driver, and a power supply. Since these elements of the driving circuit 120 are already known, their detailed description will be omitted.

As shown in FIG. 3, a plurality of gate lines 112 and a plurality of data lines 114 are arranged in the display area AA of the TFT array substrate, and a plurality of pixels 116 are defined by crossings between the gate lines 112 and the data lines 114. Although not shown, a pixel electrode and a common electrode may be arranged in the pixels 116. A black matrix and R, G, and B color filters may further be arranged on the color filter array substrate, and a polarizing film may be attached to each of a lower portion of the TFT array substrate and an upper portion of the color filter array substrate.

In this case, the common electrode may be arranged on the color filter array substrate, whereby the common electrode may be driven in a twisted nematic (TN) mode or vertical alignment (VA) mode. The common electrode may be arranged on the TFT array substrate, whereby the common electrode may be driven in an in plane switching (IPS) mode or fringe field switching (FFS) mode. A direct type backlight unit or an edge type backlight unit may be used as a backlight unit.

In FIG. 3, red pixels, green pixels, and blue pixels are arranged in a matrix arrangement using a pixel structure of two data/one gate. The red pixels, the green pixels, and the blue pixels are arranged alternately in a horizontal direction, whereas pixels of the same color are arranged in a vertical direction. Of course, white pixels may also be included, so that red, green, blue, and white pixels are arranged alternately in a horizontal direction, i.e. parallel to the direction of the data lines. However, in the following, the invention is illustrated using red, green, and blue pixels, without being limited thereto.

In more detail, the red pixels are arranged in a first vertical line VL1, the green pixels are arranged in a second vertical line VL2, the blue pixels are arranged in a third vertical line VL3, the red pixels are arranged in a fourth vertical line VL4, the green pixels are arranged in a fifth vertical line VL5, and the blue pixels are arranged in a sixth vertical line VL6. In this way, the pixels are arranged in a repeating pattern based on the vertical lines. The red pixels, the green pixels, and the blue pixels are arranged alternately in first to fourth horizontal lines HL1 to HL4. In this way, the pixels are arranged in a repeating pattern based on the horizontal lines.

In this case, two pixels adjacent to each other up and down (i.e. two neighboring pixels in a vertical direction with a gate line in between) receive scan pulses by sharing one gate line, and receive data voltages from data lines different from each other. TFTs of the pixels connected to the same data line are arranged in a zigzag shape along a vertical direction.

Based on the first gate line GL1, two red pixels R1 and R2 share the first gate line GL1. The first red pixel R1 is arranged above the first gate line GL1 to receive a scan signal, and the second red pixel R2 is arranged below the first gate line GL1 to receive a scan signal. The TFT of the first red pixel R1 is connected to the first data line DL1 to receive a data voltage, and the TFT of the second red pixel R2 is connected to the second data line DL2 to receive a data voltage.

Based on the first gate line GL1, two blue pixels B1 and B2 share the first gate line GL1. The first blue pixel B1 and the second blue pixel B2 are respectively arranged from the first red pixel R1 and the second red pixel R2 by skipping one pixel area. The first blue pixel B1 is arranged above the first gate line GL1 to receive a scan signal, and the second blue pixel B2 is arranged below the first gate line GL1 to receive a scan signal. The TFT of the first blue pixel B1 is connected to the fourth data line DL4 to receive a data voltage, and the TFT of the second blue pixel B2 is connected to the third data line DL3 to receive a data voltage.

Based on the first gate line GL1, two green pixels G1 and G2 share the first gate line GL1. The first green pixel G1 and the second green pixel G2 are respectively arranged from the first blue pixel B1 and the second blue pixel B2 by skipping one pixel area. The first green pixel G1 is arranged above the first gate line GL1 to receive a scan signal, and the second green pixel G2 is arranged below the first gate line GL1 to receive a scan signal. The TFT of the first green pixel G1 is connected to the fifth data line DL5 to receive a data voltage, and the TFT of the second green pixel G2 is connected to the sixth data line DL6 to receive a data voltage.

Based on the second gate line GL2, two green pixels G3 and G4 share the second gate line GL2. The third green pixel G3 is arranged above the second gate line GL2 to receive a scan signal, and the fourth green pixel G4 is arranged below the second gate line GL2 to receive a scan signal. The TFT of the third green pixel G3 is connected to the second data line DL2 to receive a data voltage, and the TFT of the fourth green pixel G4 is connected to the third data line DL3 to receive a data voltage.

Based on the second gate line GL2, two red pixels R3 and R4 share the second gate line GL2. The third red pixel R3 and the fourth red pixel R4 are respectively arranged from the third green pixel G3 and the fourth green pixel G4 by skipping one pixel area. The third red pixel R3 is arranged above the second gate line GL2 to receive a scan signal, and the fourth red pixel R4 is arranged below the second gate line GL2 to receive a scan signal. The TFT of the third red pixel R3 is connected to the fifth data line DL5 to receive a data voltage, and the TFT of the fourth red pixel R4 is connected to the fourth data line DL4 to receive a data voltage.

Based on the second gate line GL2, two blue pixels B3 and B4 share the second gate line GL2. The third blue pixel B3 and the fourth blue pixel B4 are respectively arranged from the third red pixel R3 and the fourth red pixel R4 by skipping one pixel area. The third blue pixel B3 is arranged above the second gate line GL2 to receive a scan signal, and the fourth blue pixel B4 is arranged below the second gate line GL2 to receive a scan signal. The TFT of the third blue pixel B3 is connected to the sixth data line DL6 to receive a data voltage, and the TFT of the fourth blue pixel B4 is connected to the seventh data line DL4 to receive a data voltage.

First Embodiment of Test Pattern for Auto Probe Test

Figure 4A:
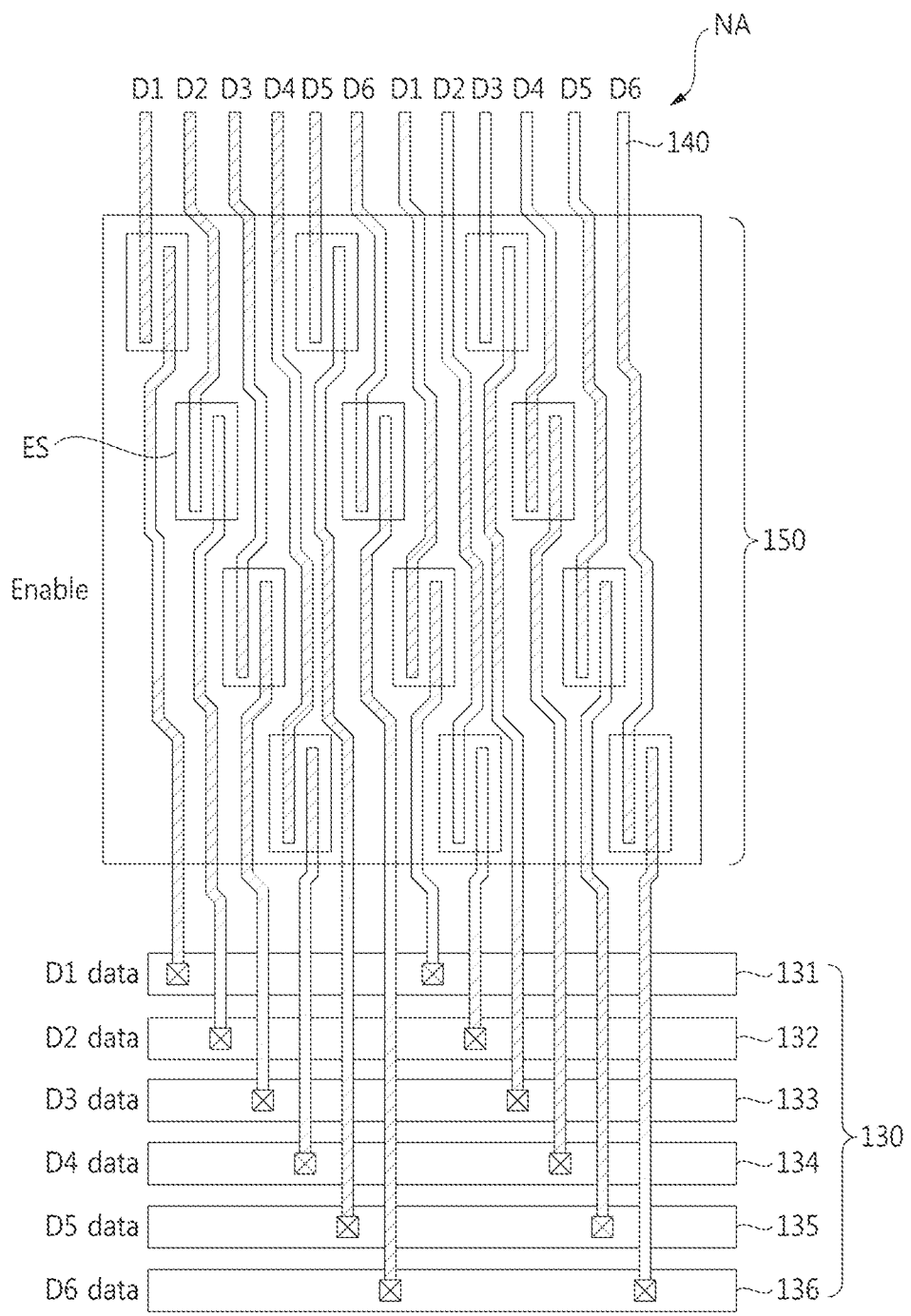
FIG. 4A illustrates a first embodiment of a test pattern for an auto probe test of a pixel structure shown in FIG. 3.
Figure 4B:
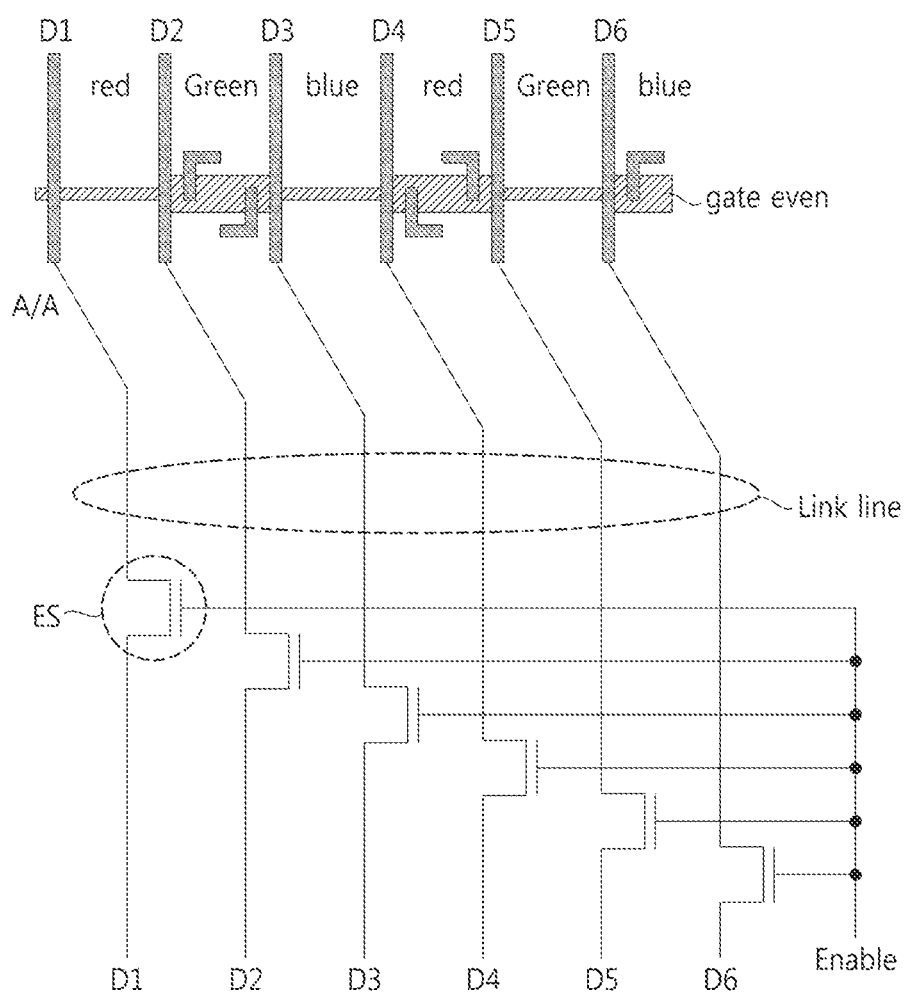
FIG. 4B illustrates an equivalent circuit of a test pattern shown in FIG. 4A, according to one embodiment.

FIG. 4A illustrates a first embodiment of a test pattern for an auto probe test of a pixel structure shown in FIG. 3. FIG. 4B illustrates an equivalent circuit of the test pattern shown in FIG. 4A.

Referring to FIGS. 4A and 4B, two pixels adjacent to each other vertically share one gate line to receive a scan pulse, and a test pattern is arranged in a non-display area NA for an auto probe test of a pixel structure of two data/one gate in which the two pixels receive data voltages from different data lines. The test pattern for an auto probe test includes a plurality of data shorting bars 130 and at least one enable switching unit 150.

The enable switching unit 150 is connected with the plurality of data shorting bars 130 through a plurality of link lines 140, and is connected with the data lines 114 through a plurality of link lines 140 and a data pad (not shown).

The auto probe test of the pixels is performed per same color for the plurality of red, green, and blue pixels. At this time, the auto probe test of the red, green, and blue pixels is performed in such a manner that the pixels of the same color are divided into two groups and then the pixels connected to the even gate lines and the pixels connected to the odd gate lines are lighted in due order, e.g. sequentially.

Since the auto probe test is performed in such a manner that the red, green, and blue pixels are divided into two groups for each color, all the pixels are divided into a total of six pixel groups D1 to D6, whereby a test signal is applied to each pixel group. To this end, six data shorting bars 130 are arranged. The test signals are applied to all the red, green, and blue pixels through the six data shorting bars 130. Although not shown, the test signals for the auto probe test of all the pixels are supplied from a test equipment which is provided separately. If white pixels are also included, all the pixels are divided into a total of eight pixel groups. Then, eight data shorting bars 130 may be arranged for applying test signals to the red, green, blue, and white pixels.

Referring to FIGS. 3 and 4A and 4B in combination, the first data shorting bar 131 is to supply the first test signal to the first pixel group D1, the second data shorting bar 132 is to supply the second test signal to the second pixel group D2, the third data shorting bar 133 is to supply the third test signal to the third pixel group D3, the fourth data shorting bar 134 is to supply the fourth test signal to the fourth pixel group D4, the fifth data shorting bar 135 is to supply the fifth test signal to the fifth pixel group D5, and the sixth data shorting bar 136 is to supply the sixth test signal to the sixth pixel group D6. In this way, the first to sixth pixel groups D1 to D6 are arranged in a repeating pattern, and a lighting test of all the red, green, and blue pixels is performed using the six data shorting bars 130 and the enable switching unit 150. If further, a white pixel is included, a seventh and eighth data shorting bar may be provided to supply a seventh and eighth test signal to the seventh and eighth pixel groups, respectively. That is, the number of data shorting bars 130 may correspond to the number of pixel groups.

A plurality of enable switches ES are arranged in the enable switching unit 150. The first to sixth test signals may be sequentially applied to the first to sixth shorting bars 131 to 136. At this time, an enable signal is applied to a gate electrode of the plurality of enable switches ES arranged in the enable switching unit 150 at the time when the first to sixth test signals are applied, whereby lighting of all the pixels may be tested. At this time, since the plurality of enable switches ES share the same enable switch, the plurality of enable switches ES are turned on and off at the same time. However, the first test signal to the sixth test signal are applied at their respective times different from one another. Therefore, the first pixel group to the sixth pixel group may be tested by being selectively lighted. Therefore, each pixel group D1 may be tested sequentially. However, all first pixel groups D1 may be tested at the same time, then all pixel groups D2 and so on. In this case, the enable switching unit may not be required.

In this case, the first to sixth test signals may be the same data voltages, or may be different data voltages different from one another.

The LCD device according to the embodiment of the present invention may allow the pixel test to be performed accurately without mixing of colors during the auto probe test of the red, green, and blue (and white) pixels by lighting the red, green, and blue (and white) pixels per color.

Second Embodiment of Test Pattern for Auto Probe Test

Figure 5A:
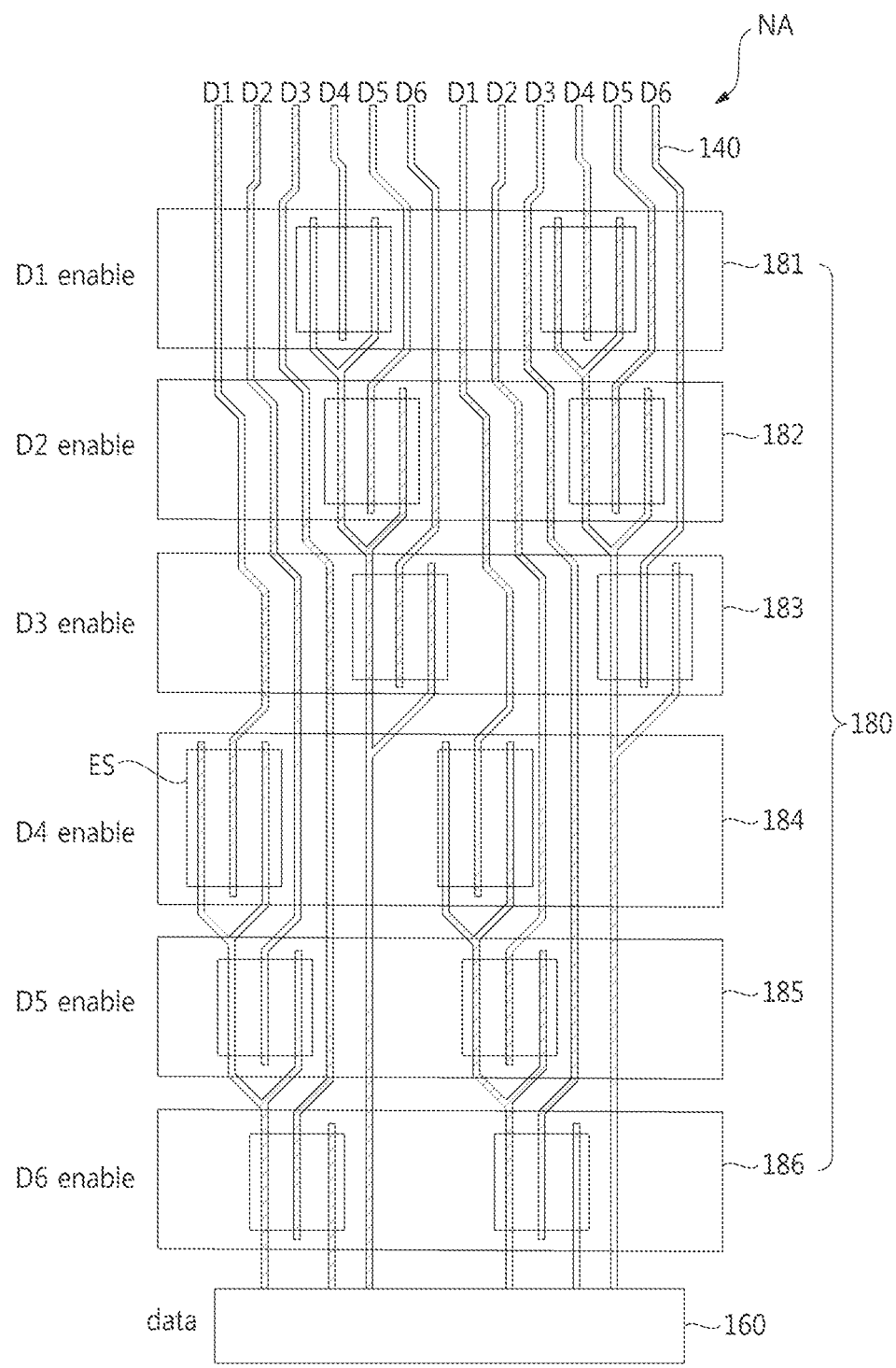
FIG. 5A illustrates a second embodiment of a test pattern for an auto probe test of a pixel structure shown in FIG. 3.
Figure 5B:
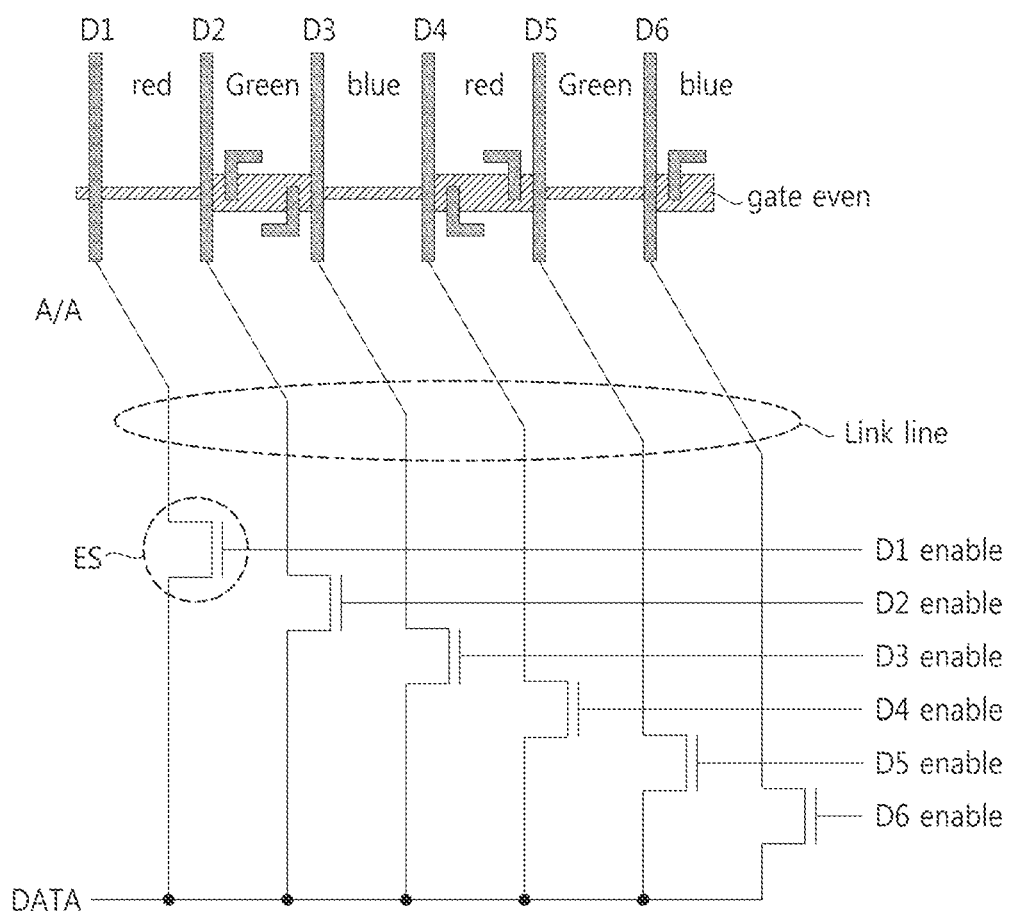
FIG. 5B illustrates an equivalent circuit of a test pattern shown in FIG. 5A, according to one embodiment.

FIG. 5A illustrates a second embodiment of a test pattern for an auto probe test of a pixel structure shown in FIG. 3. FIG. 5B illustrates an equivalent circuit of a test pattern shown in FIG. 5A.

Referring to FIGS. 5A and 5B, two pixels adjacent to each other in a vertical direction, e.g. up and down of a gate line, share one gate line to receive a scan pulse, and a test pattern is arranged in a non-display area NA for an auto probe test of a pixel structure of two data/one gate in which the two pixels receive data voltages from different data lines. The test pattern for an auto probe test includes a single data shorting bar 160 and a plurality of enable switching units 180.

The auto probe test of the pixels is performed per same color for the plurality of red, green, and blue pixels. At this time, the auto probe test of all the red, green, and blue pixels is performed in such a manner that the pixels of the same color are divided into two groups and then the pixels connected to the even gate lines and the pixels connected to the odd gate lines are lighted in due order, e.g. sequentially. Again, white pixels may also be included. Thus, as explained before, each pixel group D1 to D6 may be tested sequentially. Yet, all pixel groups D1 may be tested at the same time, then all pixel groups D2, and so on.

Since the auto probe test is performed in such a manner that the red, green, and blue pixels are divided into two groups for each color, all the pixels are divided into a total of six pixel groups, whereby a test signal is applied to each pixel group. To this end, a single data shorting bar 160 is arranged, and six enable switching units 181 to 186 are arranged. Thus, if white pixels are included, the pixels may be divided into a total of eight pixel groups and eight enable switching units may be arranged. That is, the number of enable switching units 180 may correspond to the number of pixel groups.

In the illustrated embodiment, enable switches ES corresponding to one sixth of a total number of data lines are arranged in each of the first to sixth enable switching units 181 to 186, whereby a number of enable switches ES may be equivalent to the total number of data lines.

Even in the case that a single data shorting bar 160 is used, the test signals applied to the red, green and blue pixels may be switched selectively using the first to sixth enable switching units 181 to 186.

Referring to FIGS. 3 and 5A and 5B in combination, the data shorting bar 160 is arranged in common for all the pixels. The first enable switching unit 181 is to supply the first test signal to the first pixel group D1, the second enable switching unit 182 is to supply the second test signal to the second pixel group D2. The third enable switching unit 183 is to supply the third test signal to the third pixel group D3. The fourth enable switching unit 184 is to supply the fourth test signal to the fourth pixel group D4. The fifth enable switching unit 185 is to supply the fifth test signal to the fifth pixel group D5. The sixth enable switching unit 186 is to supply the sixth test signal to the sixth pixel group D6.

In this way, the first to sixth pixel groups D1 to D6 are arranged in a repeating pattern, and a lighting test of all the red, green, and blue pixels may be performed using a single data shorting bar 160 and the sixth enable switching units 181 to 186.

The test signal is applied to the data shorting bar 160. At this time, enable signals are sequentially applied to the gate electrode of the plurality of enable switches ES arranged in the first to sixth enable switching units 181 to 186 at the time when the test signal is applied, whereby lighting of all the pixels may be tested.

The first to sixth pixel groups share one data shorting bar 160, whereby the same test signal is applied to all the pixels. However, the enable signals are applied to the plurality of enable switches ES arranged in the first to sixth enable switching units 181 to 186 at their respective times different from one another. Therefore, the first pixel group to the sixth pixel group may be tested by being selectively lighted. The LCD device according to the embodiment of the present invention may allow the pixel test to be performed accurately without mixing of colors during the auto probe test of the red, green, and blue pixels by lighting the red, green, and blue pixels per color. Since the LCD device according to an embodiment of the present invention may apply the test signals of all the pixels to a single shorting bar, an area required to arrange the shorting bar may be reduced.

In a method for testing pixels of the LCD device according to an embodiment of the present invention, the auto probe test of the red, green, and blue pixels may be performed for each color. First of all, a method for testing green pixels will be described. Subsequently methods for testing red pixels and blue pixels will be described.

Method 1 for Testing Green Pixels

Figure 6:
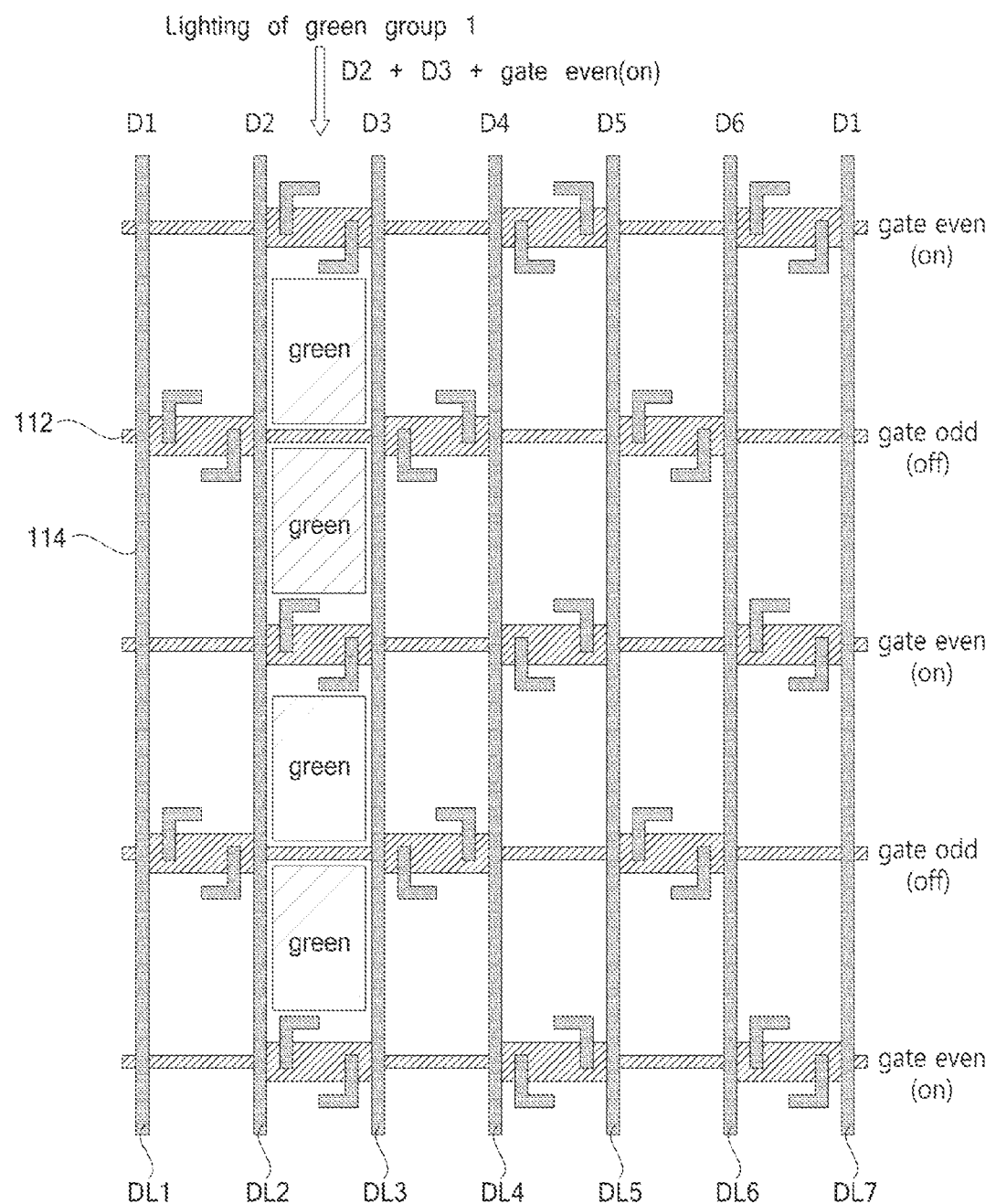
FIGS. 6 and 7 illustrate embodiments of methods for testing green pixels.
Figure 7:
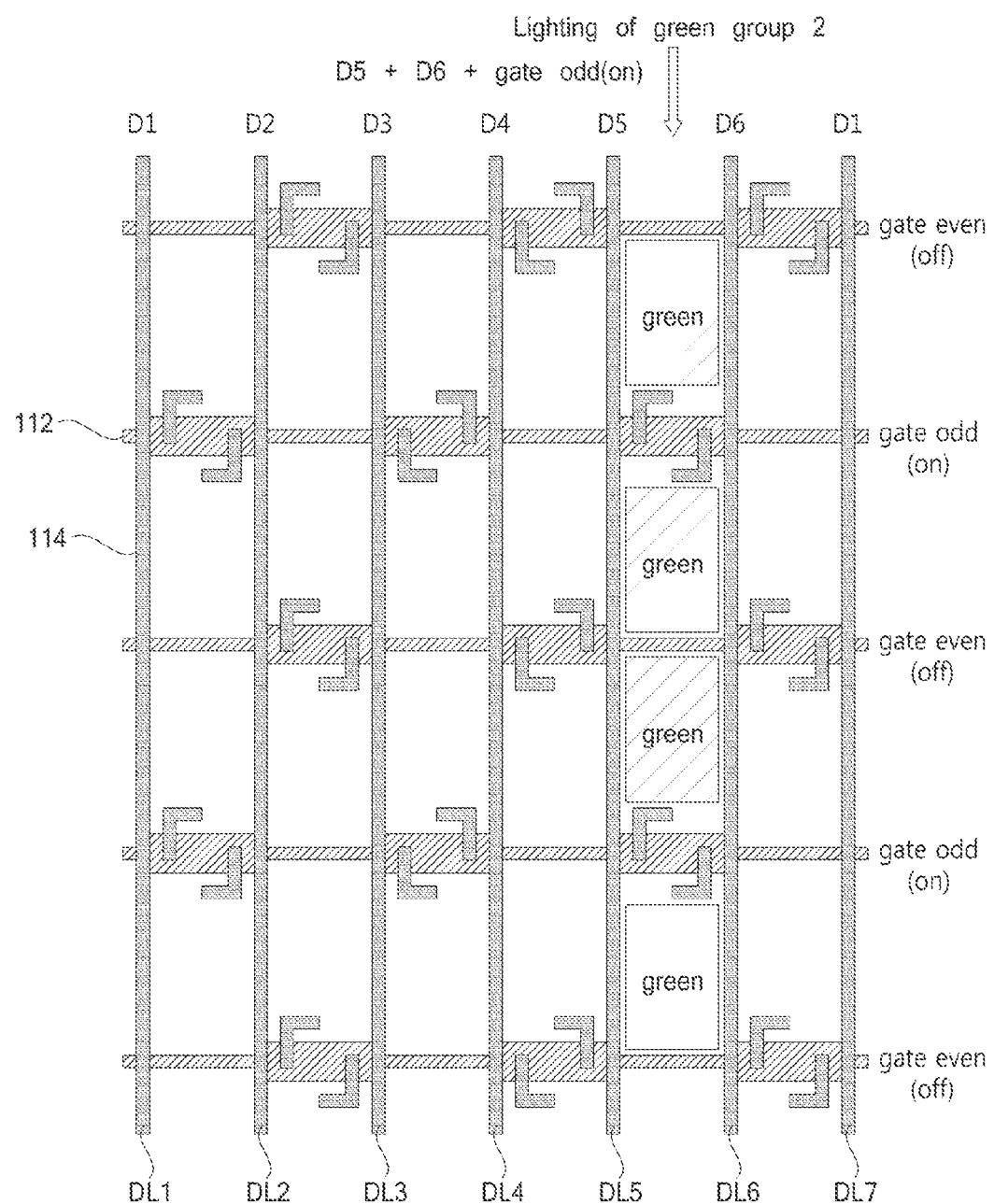

FIGS. 6 and 7 illustrate embodiments of methods for testing green pixels.

Referring to FIGS. 6 and 7, all the green pixels are divided into two groups, that is, the first green group and the second green group, and then tested. Since only some of all the pixels are shown in FIGS. 6 and 7, a method for testing pixels will be described based on the pixels shown in FIGS. 6 and 7.

All the data lines are divided into sixths, whereby first to sixth test signals are repeatedly applied to their respective data lines per six data lines. In more detail, the first test signal is applied to the first data line, the second test signal is applied to the second data line, the third test signal is applied to the third data line, the fourth test signal is applied to the fourth data line, the fifth test signal is applied to the fifth data line, and the sixth test signal is applied to the sixth data line. And, the first to sixth test signals are sequentially applied to their respective data lines per N+6th data line (N is a natural number greater than 1).

Referring to an arrangement structure of the green pixels, the green pixels are arranged between the second data line DL2 and the third data line DL3, and other green pixels are arranged between the fifth data line DL5 and the sixth data line DL6.

For description of the auto probe test, the data lines will be referred to as test lines to correspond to input of the first to sixth test signals.

The first method may be applied to the first embodiment as shown in FIG. 4. Thus, referring to FIGS. 4 and 6 in combination, scan signals are applied to the even gate lines to light the green pixels of the first green group arranged between the second test line DL2 and the third test line DL3. At this time, the second test signal is applied to the second test line DL2, and the third test signal is applied to the third test line DL3.

To this end, the second test signal is applied to the second data shorting bar 132 shown in FIG. 4, and the third test signal is applied to the third data shorting bar 133. At this time, an enable signal is applied to the enable switching unit 150, whereby the second test signal is supplied to the second test line DL2, and the third test signal is supplied to the third test line DL3.

TFTs of the green pixels that share the even gate line are turned on, and the second test signal from the second test line DL2 and the third test signal from the third test line DL3 are applied to the green pixels of which TFTs are turned on, whereby the green pixels of the first green group of all the green pixels are lighted.

Subsequently, referring to FIGS. 4 and 7 in combination, scan signals are applied to the odd gate lines to light the green pixels of the second green group arranged between the fifth test line D5 and the sixth test line D6. At this time, the fifth test signal is applied to the fifth test line DL5, and the sixth test signal is applied to the sixth test line DL6.

To this end, the fifth test signal is applied to the fifth data shorting bar 135 shown in FIG. 4, and the sixth test signal is applied to the sixth data shorting bar 136. At this time, an enable signal is applied to the enable switching unit 150, whereby the fifth test signal is supplied to the fifth test line DL5, and the sixth test signal is supplied to the sixth test line DL6.

TFTs of the green pixels that share the odd gate line are turned on, and the fifth test signal from the fifth test line DL5 and the sixth test signal from the sixth test line DL6 are applied to the green pixels of which TFTs are turned on, whereby the green pixels of the second green group of all the green pixels are lighted.

As described above, the first green group and the second green group are alternately lighted, whereby the auto probe test of all the green pixels may be performed.

Method 2 for Testing Green Pixels

The second method may be applied to the second embodiment as shown in FIG. 5. Thus, referring to FIGS. 5 and 6 in combination, scan signals are applied to the even gate lines to light the green pixels of the first green group arranged between the second test line DL2 and the third test line DL3. At this time, a test signal is applied to the second test line DL2 and the third test line DL3.

To this end, the test signal is applied to the data shorting bar 160 shown in FIG. 5, and an enable signal is supplied to the second enable switching unit 182 and the third enable switching unit 183 at the time when the test signal is input, whereby the test signal is supplied to the second test line DL2 and the third test line DL3.

TFTs of the green pixels that share the even gate line are turned on, and the test signal from the second test line DL2 and the test signal from the third test line DL3 are applied to the green pixels of which TFTs are turned on, whereby the green pixels of the first green group of all the green pixels are lighted.

Subsequently, referring to FIGS. 5 and 7 in combination, scan signals are applied to the odd gate lines to light the green pixels of the second green group arranged between the fifth test line DL5 and the sixth test line DL6. At this time, the test signal is applied to the fifth test line DL5 and the sixth test line DL6.

To this end, the test signal is applied to the data shorting bar 180 shown in FIG. 5, and an enable signal is supplied to the fifth enable switching unit 185 and the sixth enable switching unit 186 at the time when the test signal is input, whereby the test signal is supplied to the fifth test line DL5 and the sixth test line DL6.

TFTs of the green pixels that share the odd gate line are turned on, and the test signal from the fifth test line DL5 and the test signal from the sixth test line DL6 are applied to the green pixels of which TFTs are turned on, whereby the green pixels of the second green group of all the green pixels are lighted.

As described above, the first green group and the second green group are alternately lighted, whereby the auto probe test of all the green pixels may be performed.

In the method for testing pixels of the LCD device according to an embodiment of the present invention, the red, green, and blue pixels may be lighted for each color, whereby the test of the green pixels may be performed accurately without mixing of colors of the red and blue pixels during the auto probe test of the green pixels.

Error of Lighting Test

Figure 8:
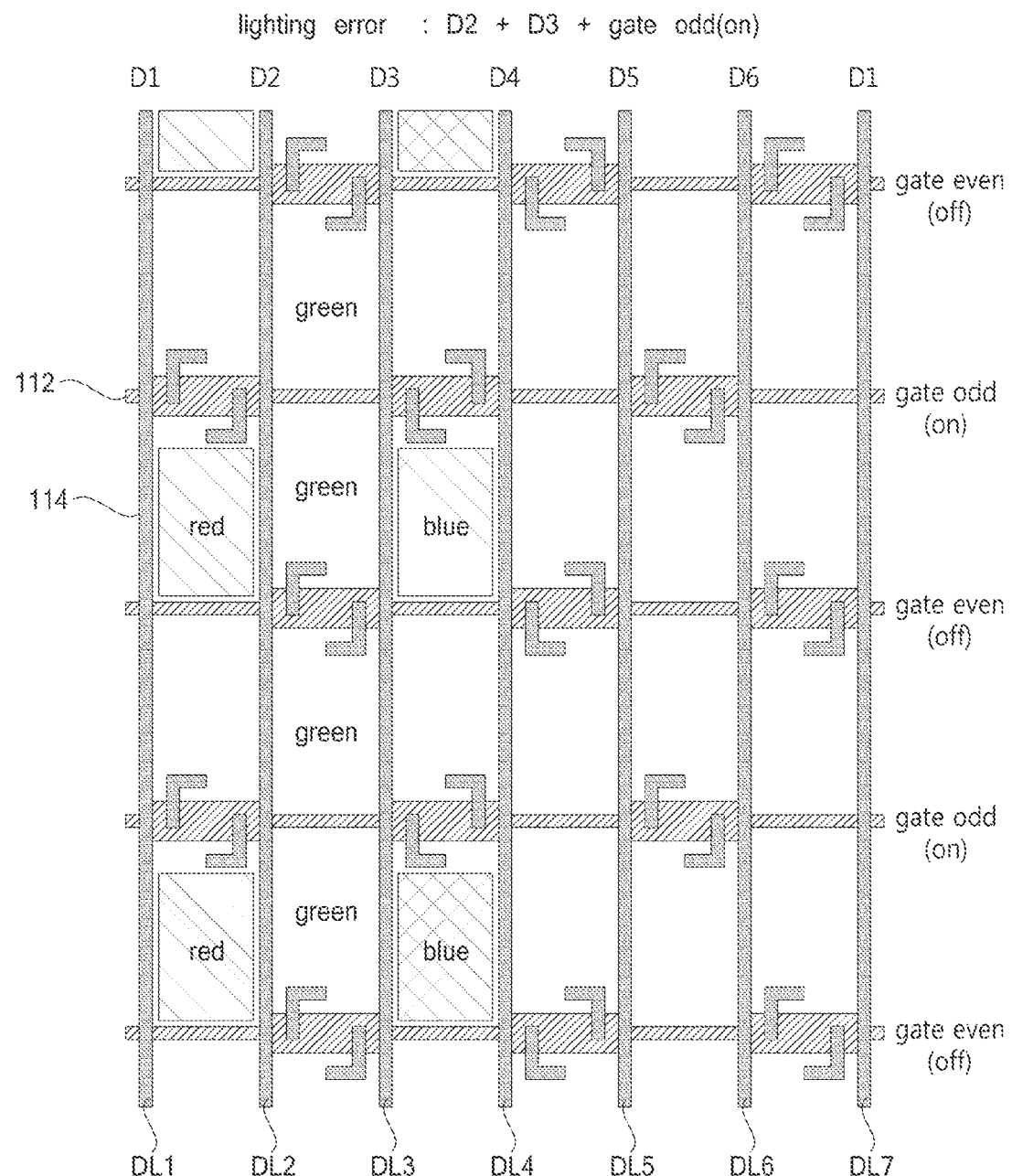
FIGS. 8 and 9 illustrate a lighting error during a test of green pixels, according to one embodiment.
Figure 9:
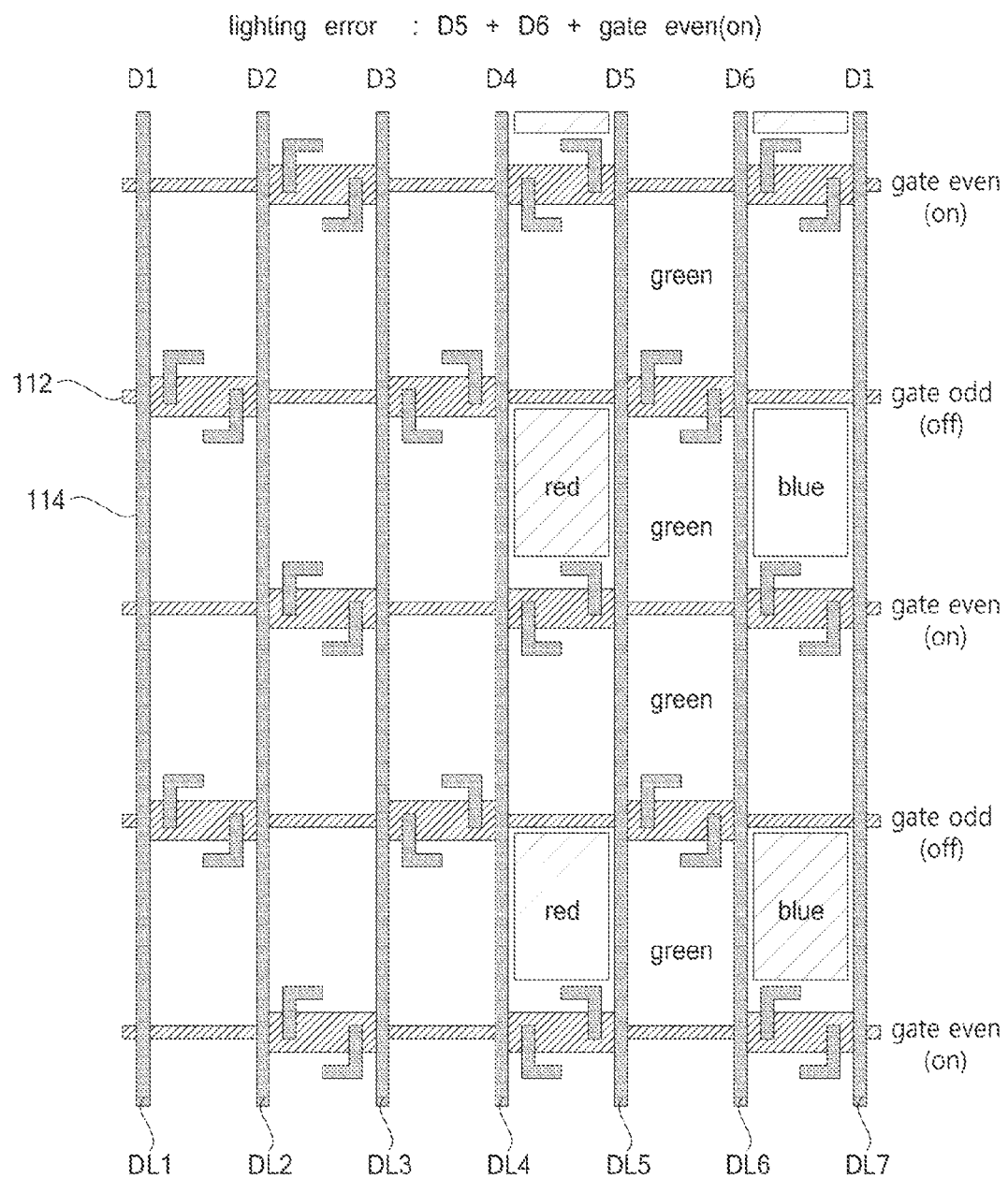

FIGS. 8 and 9 illustrate a lighting error during a test of green pixels, according to one embodiment.

Referring to FIG. 8, when pixels of the first green group are desired to be lighted, the test signal is applied to the second test line DL2 and the third test line DL3, and the scan signal is applied to the odd gate line. In this case, the red pixels and the blue pixels are lighted, whereby a lighting error occurs. That is, the first green group is not lighted, and the red pixels and the blue pixels are lighted.

Referring to FIG. 9, when pixels of the second green group are desired to be lighted, the test signal is applied to the fifth test line DL5 and the sixth test line DL6, and the scan signal is applied to the even gate line. In this case, the red pixels and the blue pixels are lighted, whereby a lighting error occurs. That is, the second green group is not lighted, and the red pixels and the blue pixels are lighted.

In order to prevent the lighting error from occurring, the scan signal is selectively supplied to the gate lines and the test signal is selectively supplied to the pixels in accordance with the methods described with reference to FIGS. 4 to 7.

Method 1 for Testing Red Pixels

Figure 10:
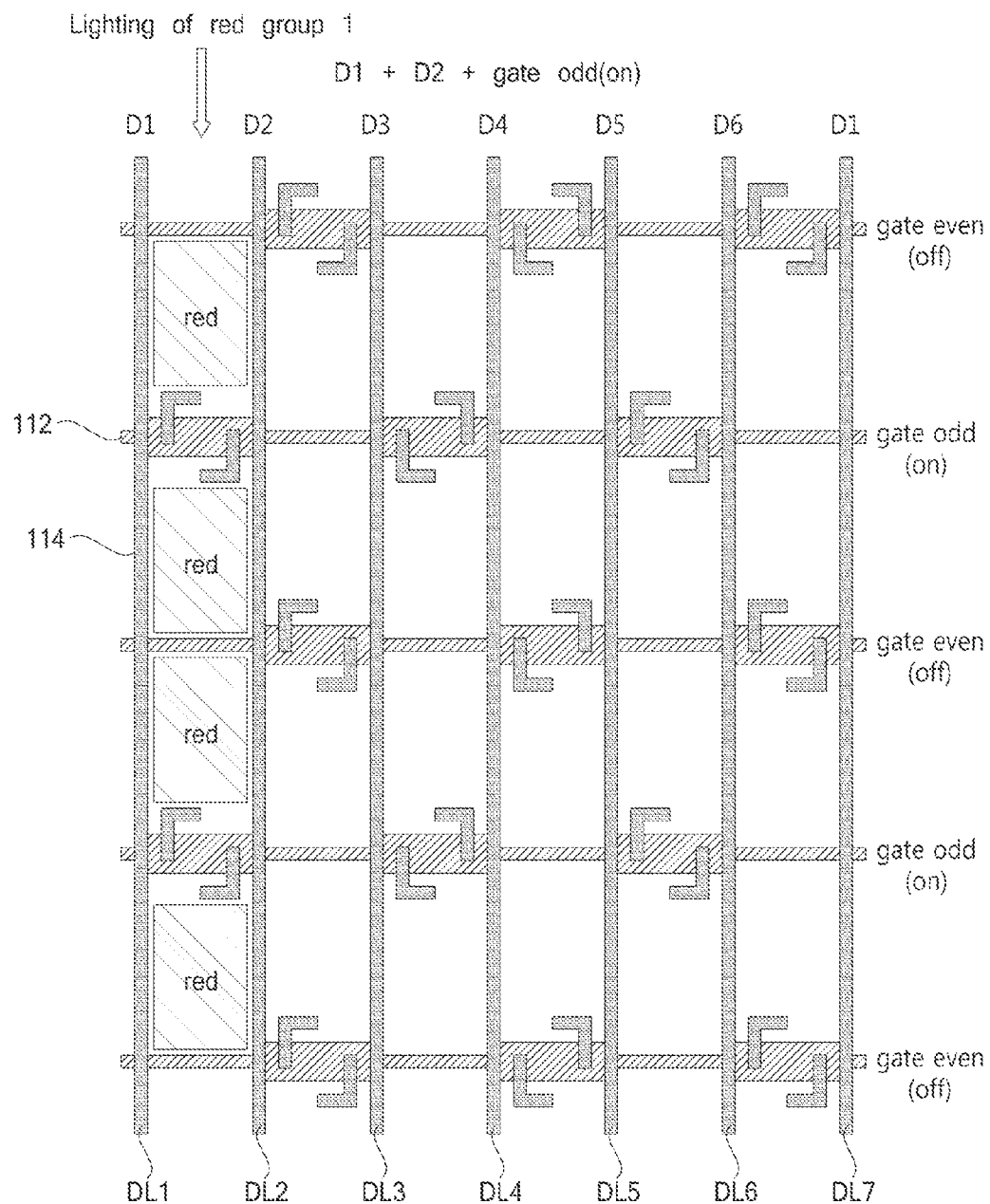
FIGS. 10 and 11 illustrate embodiments of methods for testing red pixels.
Figure 11:
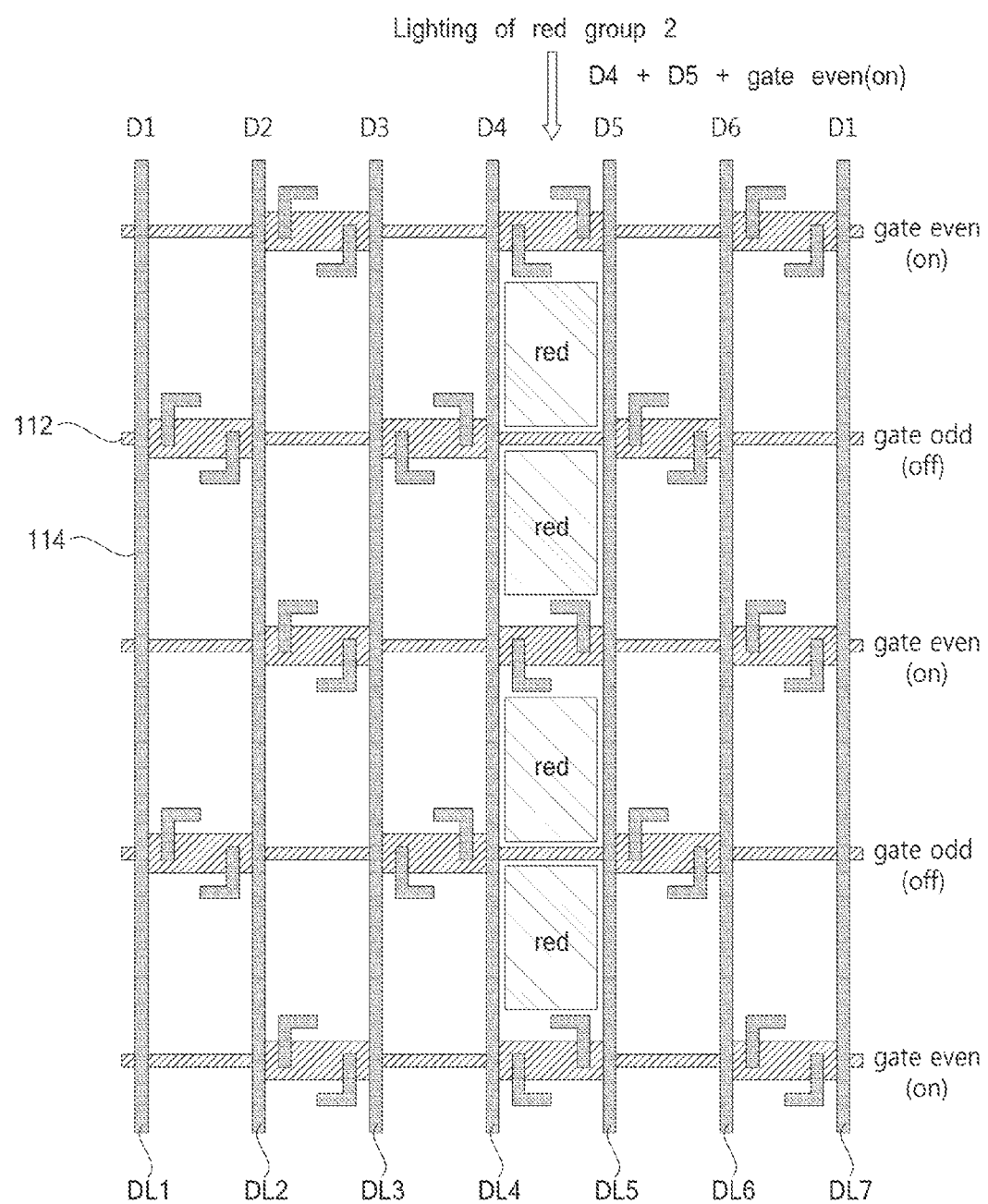

The first method may be applied to the first embodiment as shown in FIG. 4. FIGS. 10 and 11 illustrate embodiments of methods for testing red pixels.

Referring to FIGS. 10 and 11, all the red pixels are divided into two groups, that is, the first red group and the second red group, and then tested. Since only some of all the pixels are shown in FIGS. 10 and 11, a method for testing pixels will be described based on the pixels shown in FIGS. 10 and 11.

Referring to an arrangement structure of the red pixels, the red pixels are arranged between the first data line DL1 and the second data line DL2, and other red pixels are arranged between the fourth data line DL4 and the fifth data line DL5.

For description of the auto probe test, the data lines will be referred to as test lines to correspond to input of the first to sixth test signals.

Referring to FIGS. 4 and 10 in combination, scan signals are applied to the odd gate lines to light the red pixels of the first red group arranged between the first test line DL1 and the second test line DL2. At this time, the first test signal is applied to the first test line DL1, and the second test signal is applied to the second test line DL2.

To this end, the first test signal is applied to the first data shorting bar 131 shown in FIG. 4, and the second test signal is applied to the second data shorting bar 132. At this time, an enable signal is applied to the enable switching unit 150, whereby the first test signal is supplied to the first test line DL1, and the second test signal is supplied to the second test line DL2.

TFTs of the red pixels that share the odd gate line are turned on, and the first test signal from the first test line DL1 and the second test signal from the second test line DL2 are applied to the red pixels of which TFTs are turned on, whereby the red pixels of the first red group of all the red pixels are lighted.

Subsequently, referring to FIGS. 4 and 11 in combination, scan signals are applied to the even gate lines to light the red pixels of the second red group arranged between the fourth test line DL4 and the fifth test line DL5. At this time, the fourth test signal is applied to the fourth test line DL4, and the fifth test signal is applied to the fifth test line DL5.

To this end, the fourth test signal is applied to the fourth data shorting bar 134 shown in FIG. 4, and the fifth test signal is applied to the fifth data shorting bar 135. At this time, an enable signal is applied to the enable switching unit 150, whereby the fourth test signal is supplied to the fourth test line DL4, and the fifth test signal is supplied to the fifth test line DL5.

TFTs of the red pixels that share the even gate line are turned on, and the fourth test signal from the fourth test line DL4 and the fifth test signal from the fifth test line DL5 are applied to the red pixels of which TFTs are turned on, whereby the red pixels of the second red group of all the red pixels are lighted.

As described above, the first red group and the second red group are alternately lighted, whereby the auto probe test of all the red pixels may be performed.

Method 2 for Testing Red Pixels

The second method may be applied to the second embodiment as shown in FIG. 5. Referring to FIGS. 5 and 10 in combination, scan signals are applied to the odd gate lines to light the red pixels of the first red group arranged between the first test line DL1 and the second test line DL2. At this time, the test signal is applied to the first test line DL1 and the second test line DL2.

To this end, the test signal is applied to the data shorting bar 160 shown in FIG. 5, and an enable signal is supplied to the first enable switching unit 181 and the second enable switching unit 182 at the time when the test signal is input, whereby the test signal is supplied to the first test line DL1 and the second test line DL2.

TFTs of the red pixels that share the odd gate line are turned on, and the test signal from the first test line DL1 and the test signal from the second test line DL2 are applied to the red pixels of which TFTs are turned on, whereby the red pixels of the first red group of all the red pixels are lighted.

Subsequently, referring to FIGS. 5 and 11 in combination, scan signals are applied to the even gate lines to light the red pixels of the second red group arranged between the fourth test line DL4 and the fifth test line DL5. At this time, the test signal is applied to the fourth test line DL4 and the fifth test line DL5.

To this end, the test signal is applied to the data shorting bar 180 shown in FIG. 5, and an enable signal is supplied to the fourth enable switching unit 184 and the fifth enable switching unit 185 at the time when the test signal is input, whereby the test signal is supplied to the fourth test line DL4 and the fifth test line DL5.

TFTs of the red pixels that share the even gate line are turned on, and the test signal from the fourth test line DL4 and the test signal from the fifth test line DL5 are applied to the red pixels of which TFTs are turned on, whereby the red pixels of the second red group of all the red pixels are lighted.

As described above, the first red group and the second red group are alternately lighted, whereby the auto probe test of all the red pixels may be performed.

In the method for testing pixels of the LCD device according to an embodiment of the present invention, the red, green, and blue pixels may be lighted for each color, whereby the test of the red pixels may be performed accurately without mixing of colors of the green and blue pixels during the auto probe test of the red pixels.

Method 1 for Testing Blue Pixels

Figure 12:
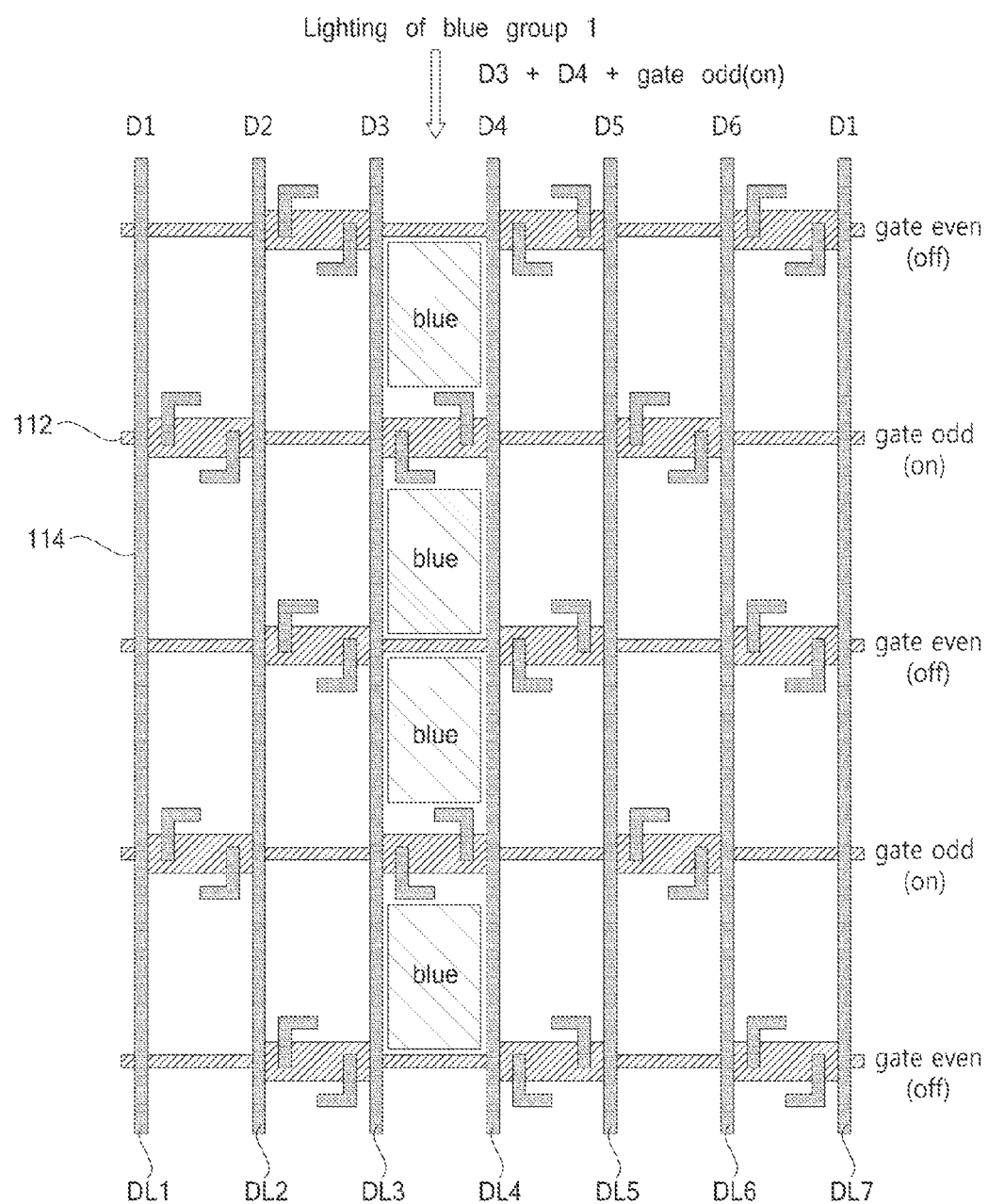
FIGS. 12 and 13 illustrate embodiments of methods for testing blue pixels.
Figure 13:
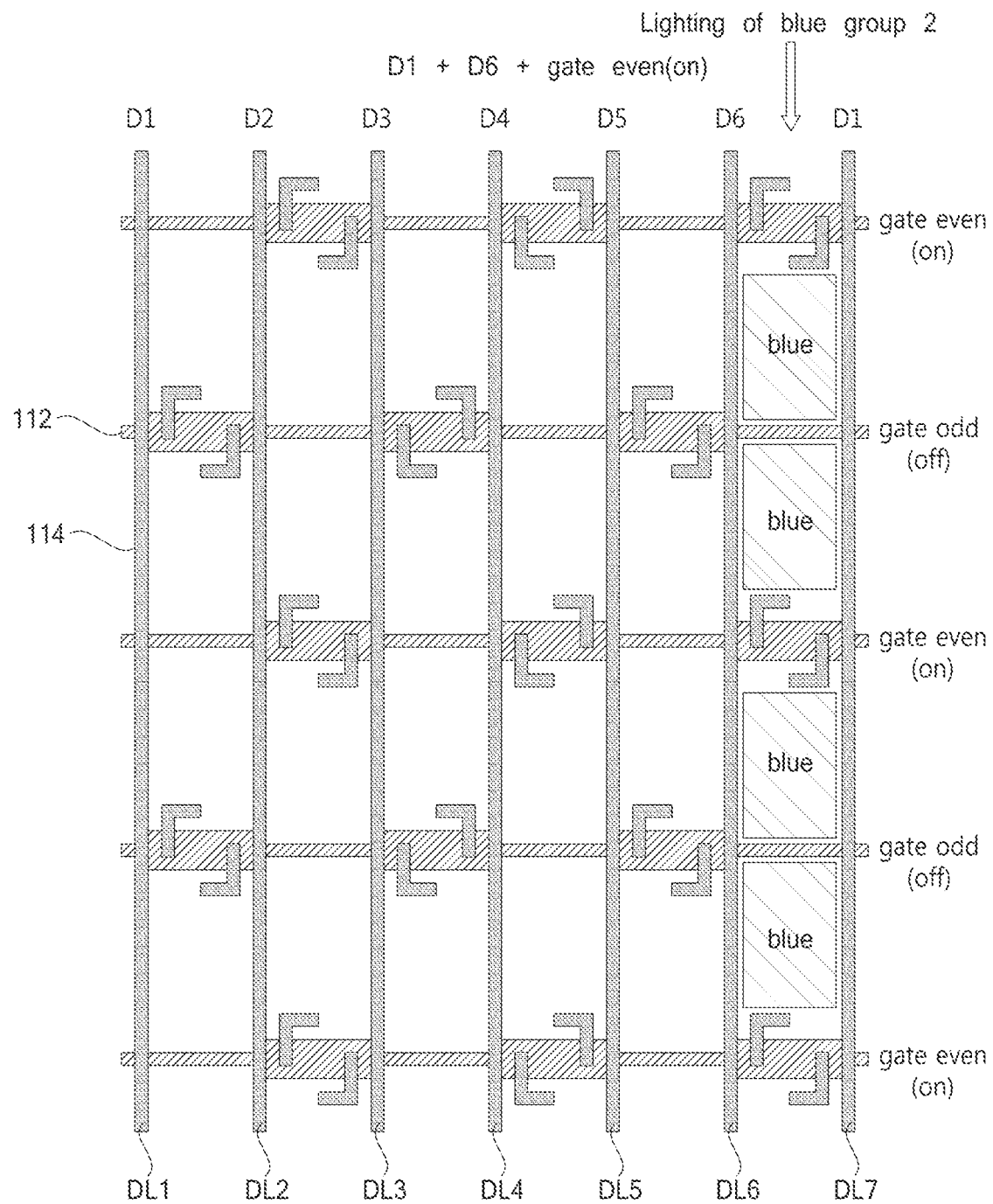

The first method may be applied to the first embodiment as shown in FIG. 4. FIGS. 12 and 13 illustrate embodiments of methods for testing blue pixels.

Referring to FIGS. 12 and 13, all the blue pixels are divided into two groups, that is, the first blue group and the second blue group; and are then tested. Since only some of all the pixels are shown in FIGS. 12 and 13, a method for testing pixels will be described based on the pixels shown in FIGS. 12 and 13.

Referring to an arrangement structure of the blue pixels, the blue pixels are arranged between the third data line DL3 and the fourth data line DL4, and other blue pixels are arranged between the sixth data line DL6 and the seventh data line DL7.

For description of the auto probe test, the data lines will be referred to as test lines to correspond to input of the first to sixth test signals.

Referring to FIGS. 4 and 12 in combination, scan signals are applied to the odd gate lines to light the blue pixels of the first blue group arranged between the third test line DL3 and the fourth test line DL4. At this time, the third test signal is applied to the third test line DL3, and the fourth test signal is applied to the fourth test line DL4.

To this end, the third test signal is applied to the third data shorting bar 133 shown in FIG. 4, and the fourth test signal is applied to the fourth data shorting bar 134. At this time, an enable signal is applied to the enable switching unit 150, whereby the third test signal is supplied to the third test line DL3, and the fourth test signal is supplied to the fourth test line DL4.

TFTs of the blue pixels that share the odd gate line are turned on, and the third test signal from the third test line DL3 and the fourth test signal from the fourth test line DL4 are applied to the blue pixels of which TFTs are turned on, whereby the blue pixels of the first blue group of all the blue pixels are lighted.

Subsequently, referring to FIGS. 4 and 13 in combination, scan signals are applied to the even gate lines to light the blue pixels of the second blue group arranged between the sixth test line DL6 and the first test line DL1. At this time, the sixth test signal is applied to the sixth test line DL6 and the first test signal is applied to the first test line DL1.

To this end, the sixth test signal is applied to the sixth data shorting bar 136 shown in FIG. 4, and the first test signal is applied to the first data shorting bar 131. At this time, an enable signal is applied to the enable switching unit 150, whereby the sixth test signal is supplied to the sixth test line DL6, and the first test signal is supplied to the first test line DL1.

TFTs of the blue pixels that share the even gate line are turned on, and the sixth test signal from the sixth test line DL6 and the first test signal from the first test line DL1 are applied to the blue pixels of which TFTs are turned on, whereby the blue pixels of the second blue group of all the blue pixels are lighted.

As described above, the first blue group and the second blue group are alternately lighted, whereby the auto probe test of all the blue pixels may be performed.

Method 2 for Testing Blue Pixels

The second method may be applied to the second embodiment as shown in FIG. 5. Referring to FIGS. 5 and 12 in combination, scan signals are applied to the odd gate lines to light the blue pixels of the first blue group arranged between the third test line DL3 and the fourth test line DL4. At this time, the test signal is applied to the third test line DL3 and the fourth test line DL4.

To this end, the test signal is applied to the data shorting bar 160 shown in FIG. 5, and an enable signal is applied to the third enable switching unit 183 and the fourth enable switching unit 184 at the time when the test signal is input, whereby the test signal is supplied to the third test line DL3 and the fourth test line DL4.

TFTs of the blue pixels that share the odd gate line are turned on, and the test signal from the third test line DL3 and the test signal from the fourth test line DL4 are applied to the blue pixels of which TFTs are turned on, whereby the blue pixels of the first blue group of all the blue pixels are lighted.

Subsequently, referring to FIGS. 5 and 13 in combination, scan signals are applied to the even gate lines to light the blue pixels of the second blue group arranged between the sixth test line DL6 and the first test line DL1. At this time, the test signal is applied to the sixth test line DL6 and the first test line DL1.

To this end, the test signal is applied to the data shorting bar 180 shown in FIG. 5, and an enable signal is supplied to the sixth enable switching unit 186 and the first enable switching unit 181 at the time when the test signal is input, whereby the test signal is supplied to the sixth test line DL6 and the first test line DL1.

TFTs of the blue pixels that share the even gate line are turned on, and the test signal from the sixth test line DL6 and the test signal from the first test line DL1 are applied to the blue pixels of which TFTs are turned on, whereby the blue pixels of the second blue group of all the blue pixels are lighted.

As described above, the first blue group and the second blue group are alternately lighted, whereby the auto probe test of all the blue pixels may be performed.

In the method for testing pixels of the LCD device according to an embodiment of the present invention, the red, green, and blue pixels may be lighted for each color, whereby the test of the blue pixels may be performed accurately without mixing of colors of the red and green pixels during the auto probe test of the blue pixels.

As described above, according to the present invention, the following advantages may be obtained.

An LCD device according to the embodiment of the present invention may provide the test pattern for the auto probe test of the pixel structure of two data/one gate in which the pixels adjacent to each other vertically share a gate line.

Also, according to the present invention, a method for testing pixels may be provided for an auto probe test of a pixel structure of two data/one gate in which the pixels adjacent to each other vertically share the gate line.

In a method for testing pixels of the LCD device according to an embodiment of the present invention, the red, green, and blue pixels may be lighted for each color, whereby the auto probe test of the red, green, and blue pixels may be performed accurately without mixing of colors of the pixels.

It will be apparent to those skilled in the art that various modifications and variations can be made in the present invention without departing from the scope of the invention. Thus, it is intended that the present invention covers the modifications and variations of this invention provided they come within the scope of the appended claims and their equivalents.

What is claimed is:

1. A liquid crystal display (LCD) device comprising:
   a liquid crystal panel including a display area and a non-display area;
   a plurality of gate lines;
   a plurality of data lines;
   a plurality of pixels arranged in the display area, the pixels including pixels of different colors, the pixels of each color divided into a plurality of groups, and wherein two pixels, which are adjacent to each other in a direction perpendicular to a direction of the gate lines, are connected to a same gate line and to different data lines of the data lines; and
   a test pattern, arranged in the non-display area, for supplying a test signal to each of the plurality of pixels, wherein the test pattern includes:
      a plurality of data shorting bars including a first data shorting bar and a second data shorting bar; and
      at least one switching unit connected to the data lines and to the data shorting bars, the switching unit configured to:
         selectively supply the test signal to a first group of the plurality of groups of a given pixel color by electrically coupling the first data shorting bar to a first data line of the plurality of data lines; and
         selectively supply the test signal to a second group of the plurality of groups of the given pixel color, after supplying the test signal to the first group, by electrically coupling the second data shorting bar to a second data line of the plurality of data lines.

2. The LCD device according to claim 1, wherein the pixels of each color are divided into two pixel groups depending on whether the pixels are connected to an even-numbered gate line or to an odd-numbered gate line.

3. The LCD device according to claim 1, wherein the number of data shorting bars corresponds to the number of pixel groups.

4. The LCD device according to claim 1, wherein pixels of one pixel group are commonly connected by one data shorting bar.

5. The LCD device according to claim 1, wherein the plurality of data shorting bars includes a pair of data shorting bars for each color.

6. The LCD device of claim 5, wherein the test pattern includes a single switching unit for selectively supplying the test signals input from the plurality of data shorting bars to the corresponding groups of pixels.

7. A method for testing pixels of a liquid crystal display (LCD) device having a plurality of gate lines and a plurality of data lines, the pixels having different colors, the pixels of each color divided into a plurality of groups, wherein two pixels adjacent to each other in a direction perpendicular to a direction of the gate lines are connected to a same gate line and to different data lines of the data lines, the method comprising:
   selectively supplying a test signal to a first group of the plurality of groups of a given pixel color by electrically coupling a first data shorting bar to a first data line of the plurality of data lines; and
   selectively supplying the test signal to a second group of the plurality of groups of the given pixel color, after supplying the test signal to the first group, by electrically coupling a second data shorting bar to a second data line of the plurality of data lines.

8. The method according to claim 7, wherein the pixels of each color are divided into two pixel groups depending on whether the pixels are connected to an even-numbered gate line or to an odd-numbered gate line.

9. The method according to claim 7, further comprising:
   lighting the first group of the plurality of groups of the given pixel color by supplying a scan signal to an odd gate line while the test signal is being selectively supplied to the first group; and
   lighting the second group of the plurality of groups of the given pixel color by supplying a scan signal to an even gate line while the test signal is being selectively supplied to the first group.

10. The method of claim 9, further comprising repeating the step of lighting a first and second pixel group for each additional color.

11. The method according to claim 7, wherein selectively supplying the test signal to the first group of the plurality of groups of the given pixel color further comprises supplying an enable signal to a switching unit.

* * * * *